United States Patent
Honksasalo et al.

(10) Patent No.: US 7,058,091 B2
(45) Date of Patent: Jun. 6, 2006

(54) MAPPING OF INTERNET PROTOCOL BASED DATA

(75) Inventors: Harri Honksasalo, Kauniainen (FI); Yanyan Wu, Farnborough (GB); Anu Virtanen, Espoo (FI)

(73) Assignee: Nokia Corporation, Espoo (FI)

( * ) Notice: Subject to any disclaimer, the term of this patent is extended or adjusted under 35 U.S.C. 154(b) by 945 days.

(21) Appl. No.: 10/035,689

(22) Filed: Nov. 8, 2001

(65) Prior Publication Data

US 2002/0150072 A1 Oct. 17, 2002

(30) Foreign Application Priority Data

Nov. 10, 2000 (GB) .................................. 0027535.4

(51) Int. Cl.
*H04J 3/02* (2006.01)

(52) U.S. Cl. ..................................... 370/537; 370/487

(58) Field of Classification Search ................ 370/320, 370/329, 326, 335, 342, 336, 349, 535, 537, 370/538, 540, 487, 498, 543, 471, 479, 441, 370/437, 473, 490, 536, 431
See application file for complete search history.

(56) References Cited

U.S. PATENT DOCUMENTS 6,675,016 B1 * 1/2004 Lucidarme et al. ...... 455/452.2
6,917,643 B1 * 7/2005 Imura .......................... 375/140

* cited by examiner

*Primary Examiner*—Brenda Pham
(74) *Attorney, Agent, or Firm*—Quire, Sanders & Dempsey, LLP

(57) ABSTRACT

A method of mapping internet protocol (IP) based data and signalling data for a forming a single connection between a mobile handsets in a code division multiple access (CDMA) system. Two or more sets of physical channels are used, in which each of the physical channels in each set has the same spreading factor as other physical channels in that set. The IP-based data including header data and application data, each of the header data, signalling data and application data are assigned to at least one transport channel ("TrCH"). At least a first one of the transport channels is mapped to a first one of the sets of physical channels. Simultaneously, at least a second one of the transport channels is mapped to a second one of the sets of physical channels.

22 Claims, 1 Drawing Sheet

MAPPING OF INTERNET PROTOCOL BASED DATA

FIELD OF INVENTION

The present invention relates to the field of radio telecommunications, and more particularly to mapping of data from an Internet Protocol (IP) environment into a format suitable for radio transmission.

The invention has been developed primarily for facilitating provision of IP-based services in a WCDMA-based mobile telephonic environment, and will be described hereinafter with reference to that application. However, it will be appreciated that the invention is not limited to use in that field.

BACKGROUND TO INVENTION

Over the last few years, a desire for improved data rate and more efficient use of dedicated frequency spectra has led to the proposal and adoption of wideband CDMA as a major standard for next generation mobile telephony. The most popular scheme is that being developed by the 3GPP group, which will be well known to those in the field of mobile telecommunications.

There has been a move over a similar period of time towards delivering data in packet form. One protocol for packet-based transmission is the Internet Protocol (IP) standard. Whilst IP-based transmission of data embodies certain efficiencies, it does have some disadvantages when applied to a mobile telecommunications environment.

For example, the ratio of header information to payload data can often be relatively high. In an internet computing context, such a limitation is of little consequence. However, in a radio communications environment with limited spectrum available, it is desirable to reduce this ratio. One proposal presently being considered is the use of header compression, which would reduce the total number of bits to be transmitted.

Proposed header compression schemes typically still require transmission of an initial or periodic uncompressed header to provide context for the subsequent compressed versions. These uncompressed headers can be relatively large, and, when combined with the payload data and signalling data required for radio transmission, can require the use of relatively low spreading factors. This has the undesirable impact of either reducing available code-space (in a WCDMA system) or requiring high puncture rates.

The most widely adopted specification for the third generation of mobile telecommunications has been proposed, and is further being developed, by the $3^{rd}$ Generation Partnership Project (3GPP). Code Division Multiple Access (CDMA) has emerged as the most favoured technology for third generation telecommunications, the wideband CDMA (WCDMA) embodiment adopted by 3GPP being known as UTRA (Universal Terrestrial Radio Access). WCDMA, and its application to third generation mobile telephony and the 3GPP standards being developed, is described in some detail in 3GPP Technical Specification 25.212, the contents of which are incorporated herein by cross reference.

In UTPA, transport channels are used to deliver data from higher layers to the physical layers that deal with the mechanics of encoding and transmission over the air. Each transport channel carries data from a different source. This can include, for example, voice data, signalling data used by the system during transmission or IP-based data such as multimedia communications or IP-voice data (along with the header data required for IP communication).

Once the physical layer receives the signal data, it is, amongst other things, spread using a spreading code. This is achieved by multiplying the data with a spreading code, which is pseudo-random in nature and of a particular length, the length of the code being referred to as the spreading factor. For a given bandwidth, a spreading factor 8 would result in data at ⅛ the given chip rate.

Given a restricted bandwidth within which to operate, once packets of data reach a certain size, it becomes necessary to reduce the spreading factor to ensure that bandwidth of the resultant signal falls within the available spectrum.

In the case of IP communications, and IP voice in particular, headers are used for signalling, routing and other ancillary data. The header for each packet can itself require considerably more bits than the payload data within the packet, sometimes by a factor of 2 or more. The present UTRA standard proposed by 3GPP also requires that the header and payload data for a given channel be delivered on the same transport channel and therefore mapped to the same physical channel (or coded composite transport channel).

Spreading of data for an IP voice connection results in some undesirable characteristics. Due to the size of the header, payload and signalling data, it may become necessary to use a relatively low spreading factor to ensure that the encoded signal remains within allocated spectrum. One difficulty with this is that use of a low spreading factor code results in a removal of a relatively large number of orthogonal codes of higher spreading factor from the available code space.

SUMMARY OF INVENTION

According to a first aspect of the invention, there is provided a method of mapping internet protocol (IP) based data and signalling data for a forming a single connection between a first station and a second station in a code division multiple access (CDMA) system, using two or more sets of physical channels, each of the physical channels in each set utilising the same spreading factor as other physical channels in that set, the IP-based data including header data and application data, each of the header data, signalling data and application data being assigned to at least one transport channel ("TrCH"), the method including the steps of:

(a) mapping at least a first one of the transport channels to a first one of the sets of physical channels; and (b) mapping at least a second one of the transport channels to a second one of the sets of physical channels.

Preferably, a first spreading factor is applied to the first set of physical channels on the basis of a data rate of the first one of the transport channels, and a second spreading factor is applied to the second set of physical channels on the basis of a data rate of the second one of the transport channels.

More preferably, the first spreading factor and the second spreading factor are different from each other.

In one form, the first spreading factor is constant, and the second spreading factor is changed over time. Preferably, wherein the second spreading factor is varied between first and second spreading factor values.

In a preferred embodiment, the size of the header is variable over time. Preferably in this embodiment, the size of the header varies over time depending upon the amount or type of header compression applied.

In one embodiment, a full header is initially transmitted and a compressed header is subsequently transmitted, the second spreading factor applied to the second set of physical channels being a relatively low value for the initial transmission and being a relatively high value for the subsequent transmission.

Preferably, each of the sets of physical channels is defined by a coded composite transport channel (CCTrCH) in an UTRA-based communications system.

In one form, one or more of the sets of physical channels includes a single physical channel. Alternatively or in addition, it is preferred that the one or more of the sets of physical channels includes a plurality of physical channels.

In a second aspect, the present invention provides a network element for mapping internet protocol (IP) based data and signalling data to form a single connection between a first station and a second station in a code division multiple access (CDMA) system, using two or more sets of physical channels, each of the physical channels in each set utilising the same spreading factor as other physical channels in that set, the IP-based data including header data and application data, each of the header data, signalling data and application data being assigned to at least one transport channel ("TrCH"), the network element including mapping means configured for:

(a) mapping at least a first one of the transport channels to a first one of the sets of physical channels; and
(b) mapping at least a second one of the transport channels to a second one of the sets of physical channels.

Preferably, a first spreading factor is applied to the first set of physical channels on the basis of a data rate of the first one of the transport channels, and a second spreading factor is applied to the second set of physical channels on the basis of a data rate of the second one of the transport channels.

More preferably, the first spreading factor and the second spreading factor are different from each other.

In one form, the first spreading factor is constant, and the second spreading factor is changed over time. Preferably, wherein the second spreading factor is varied between first and second spreading factor values.

In a preferred embodiment, the size of the header is variable over time. Preferably in this embodiment, the size of the header varies over time depending upon the amount or type of header compression applied.

In one embodiment, a full header is initially transmitted and a compressed header is subsequently transmitted, the second spreading factor applied to the second set of physical channels being a relatively low value for the initial transmission and being a relatively high value for the subsequent transmission.

Preferably, each of the sets of physical channels is defined by a coded composite transport channel (CCTrCH) in an UTRA-based communications system.

In one form, one or more of the sets of physical channels includes a single physical channel. Alternatively or in addition, it is preferred that the one or more of the sets of physical channels includes a plurality of physical channels.

BRIEF DESCRIPTION OF DRAWING

Preferred embodiments of the invention will now be described, by way of example only, with reference to the accompanying drawing. The drawing is a schematic of a transport channel multiplexing structure, embodied in a network element for implementing mapping of internet protocol (IP) based data and signalling data for a forming a single connection between a first station and a second station in a code division multiple access (CDMA) system, according to the invention.

DETAILED DESCRIPTION OF PREFERRED AND OTHER EMBODIMENTS

Figure 1:
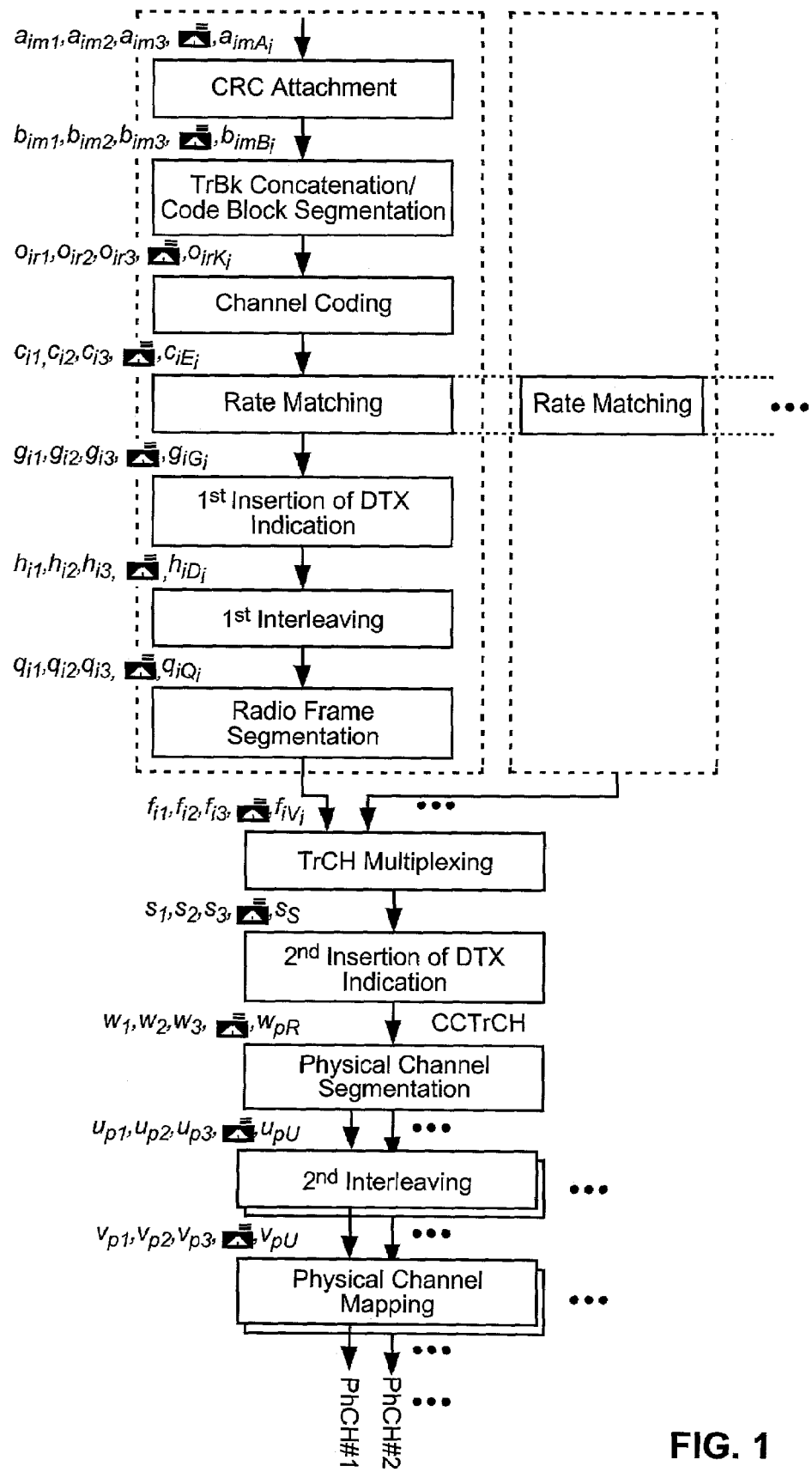

In the preferred form, the invention is applied to a modified version of UTRA, a WCDMA standard defined by 3GPP. Two sets of physical channels, each defined by a CCTrCH, are used to provide a single connection. One or more TrCHs are mapped to each of the two CCTrCHs in such a way that the amount of code space removed from availability by the need for low spreading factors is minimised or at least reduced. The number of actual physical channels to which each CCTrCH is mapped is not critical.

The particular way in which the TrCHs are mapped to the CCTrCHs will vary depending upon, for example, the bandwidth available, the sizes of the headers, application/payload and signalling data in question, or whether compression has been employed.

EXAMPLE 1

IP-Voice Data, with or without Header Compression

TABLE 1

| AMR 12.2 TTI = 20 ms | Header TrCH 1 | Voice TrCH 2 | Signalling TrCH 3 |
|---|---|---|---|
| | Full header; or Compressed header (first or second order) | AMR IF2 | 3.4 kbps |

Table 1 shows the contents of first, second and third transport channels (TrCH 1, 2 & 3 respectively) for one IP packet, mapping onto first and second CCTrCHs, at 1 voice frame per RTP packet. The mapping of the transport channels to the physical channels via the CCTrCHs is as follows:

[TrCH 1+TrCH2] is mapped to CCTrCH 1

[TrCH 3] is mapped to CCTrCH 2.

In this case, the voice data and its associated header data are mapped to the first CCTrCH channel. When the full header frame is delivered, the voice frame has to be omitted. Because of the size of the data packets involved (ie, the relatively high data rate required), a spreading factor (SF) of 128 may be employed. The signalling data for the connection is mapped to the second CCTrCH, but because of its lower data rate, a higher SF of 256 can be used. This results in substantial code space savings compared to mapping all of the data onto one CCTrCH, and even more so given that more efficient use of the code space is made possible. It will be appreciated that a very low spreading factor would be required if all of the data was to be mapped to a single CCTrCH. Alternatively, an unacceptably high puncture rate would need to be tolerated, as will be understood by those skilled in the art.

EXAMPLE 2

IP-Voice Data, with Header Compression

TABLE 2

| AMR 12.2 TTI = 20 ms | Full Header TrCH 1 | Compressed Header TrCH 2 | Voice TrCH 3 | Signalling TrCH 4 |
|---|---|---|---|---|
| | Full header | Compressed header (first or second order) | AMR IF2 | 3.4 kbps |

Table 2 shows the contents of first, second, third and fourth transport channels (TrCH 1, 2, 3 & 4 respectively) for IP voice frame mapping onto first and second CCTrCHs, at 1 voice frame per RTP packet. The mapping of the transport channels to physical channels via CCTrCHs is as follows:

[TrCH 1] is mapped to CCTrCH 1
[TrCH 2] is mapped to CCTrCH 2.
[TrCH 3+TrCH 4] is mapped to CCTrCH 1

In this case, the voice data and its associated header data are split from each other and delivered via different TrCHs to the physical layer. They are also mapped respectively to different CCTrCHs. It will be appreciated by those skilled in the art that the present 3GPP-99 standard does not allow delivery of associated header and voice data via different TrCHs, and so a slight to the standard needs to be made to account for this.

In this embodiment, the full header is only delivered at the start of the connection, to provide context for the subsequent compressed header data. The larger size of the uncompressed header data means that for it to be encoded along with the voice and signalling data on CCTrCH 1, an SF of 128 must be used. However, once the full header has been transmitted, subsequent header data is supplied via the second physical channel, CCTrCH 2 at a spreading factor of 256. The voice and signalling data continue to be mapped to CCTrCH 1 at an SF of 128. This, again, results in more efficient use of available code space.

It will be appreciated by those skilled in the art that many other mappings of a plurality of TrCHs to two (or more) CCTrCHs are available. The efficiencies of each will vary depending upon such factors as the sizes of the headers, the types of compression used, and the available spectrum. Also, the specific SFs mentioned in relation to the preferred embodiments are exemplary only, and may differ depending upon factors such as the type of data being sent, the compression used, and the available bandwidth.

In another aspect, the preferred form of the invention is applied at a network element, which will usually take the form of a base station. It will be appreciated, however, that "network element" is intended to include any combination of sub-elements that are configured to implement the invention as defined in the relevant claims.

FIG. 1 shows a multiplexing structure applied in the network element. The steps involved are self-explanatory in view of the description of the embodiment above.

It will also be understood that the invention can be applied to other CDMA standards in which it is desired to map IP-based data (such as IP-voice) onto physical channels. For this reason, it is to be understood that any references to acronyms or abbreviations used in any particular embodiment of CDMA or WCDMA are intended to include any near equivalent components or features in other CDMA/WCDMA systems.

Although the preferred embodiments map multiple transport channels onto two channels with different SFs, ie CCTrCHs, in some case it can also be desirable to map the transport channels to more than two CCTrCHs. In some specific cases, for example, more efficient use can be made of available code space by splitting data over three or more channels, each of which can then utilise a higher spreading factor.

It will be understood that the 3GPP standard to which the preferred embodiment applies is presently being developed and modified on an ongoing basis. Accordingly, there may some technical protocol parameters that need to be modified to allow the invention to be implemented in some specific embodiments if it is to be implemented under that protocol in future. However, it is a routine matter to implement the invention using a proprietary standard based substantially on the 3GPP protocol with suitable modifications.

The invention also has application to other types of IP data, such as IP encoded multimedia, or other packetised data protocols, especially those employing relatively high header to payload ratios.

Although the invention has been described with reference to a number of specific embodiments, it will be appreciated by those skilled in the art that the invention can be embodied in many other forms.

The invention claimed is:

1. A method of mapping internet protocol (IP) based data and signalling data for a forming a single connection between a first station and a second station in a code division multiple access (CDMA) system, using two or more sets of physical channels, each of the physical channels in each set utilizing the same spreading factor as other physical channels in that set, the IP-based data including header data and application data, each of the header data, signalling data and application data being assigned to at least one transport channel ("TrCH"), the method including the steps of:
    (a) mapping at least a first one of the transport channels to a first one of the sets of physical channels; and
    (b) mapping at least a second one of the transport channels to a second one of the sets of physical channels.

2. A method according to claim 1, wherein a first spreading factor is applied to the first set of physical channels on the basis of a data rate of the first one of the transport channels, and a second spreading factor is applied to the second set of physical channels on the basis of a data rate of the second one of the transport channels.

3. A method according to claim 2, wherein the first spreading factor and the second spreading factor are different from each other.

4. A method according to claim 3, wherein the first spreading factor is constant, and the second spreading factor is changed over time.

5. A method according to claim 4, wherein the second spreading factor is varied between first and second spreading factor values.

6. A method according to claim 4, wherein the size of the header is variable over time.

7. A method according to claim 6, wherein the size of the header varies over time depending upon the amount or type of header compression applied.

8. A method according to claim 6, wherein a full header is initially transmitted and a compressed header is subsequently transmitted, the second spreading factor applied to the second set of physical channels being a relatively low value for the initial transmission and being a relatively high value for the subsequent transmission.

9. A method according to claim 1, wherein each of the sets of physical channels is defined by a coded composite transport channel (CCTrCH) in an UTRA-based communications system.

10. A method according to claim 1, wherein one or more of the sets of physical channels includes a single physical channel.

11. A method according to claim 1, wherein one or more of the sets of physical channels includes a plurality of physical channels.

12. A network element for mapping internet protocol (IP) based data and signalling data to form a single connection between a first station and a second station in a code division multiple access (CDMA) system, using two or more sets of physical channels, each of the physical channels in each set utilizing the same spreading factor as other physical channels in that set, the IP-based data including header data and application data, each of the header data, signalling data and application data being assigned to at least one transport channel ("TrCH"), the network element including mapping means configured for:

(a) mapping at least a first one of the transport channels to 10 a first one of the sets of physical channels; and (b) mapping at least a second one of the transport channels to a second one of the sets of physical channels.

13. A network element according to claim 12, wherein a first spreading factor is applied to the first set of physical channels on the basis of a data rate of the first one of the transport channels, and a second spreading factor is applied to the second set of physical channels on the basis of a data rate of the second one of the transport channels.

14. A network element according to claim 13, wherein the first spreading factor and the second spreading factor are different from each other.

15. A network element according to claim 13, wherein the first spreading factor is constant, and the second spreading factor is changed over time.

16. A network element according to claim 15, wherein the second spreading factor is varied between first and second spreading factor values.

17. A network element according to claim 15, wherein the size of the header is variable over time.

18. A network element according to claim 17, wherein the size of the header varies over time depending upon the amount or type of header compression applied.

19. A network element according to claim 17, wherein a full header is initially transmitted and a compressed header is subsequently transmitted, the second spreading factor applied to the second set of physical channels being a relatively low value for the initial transmission and being a relatively high value for the subsequent transmission.

20. A network element according to claim 12, wherein each of the sets of is defined by a coded composite transport channel (CCTrCH) in an UTRA-based communications system.

21. A network element according to claim 12, wherein one or more of the sets of physical channels includes a single physical channel.

22. A network element according to claim 12, wherein one or more of the sets of physical channels includes a plurality of physical channels.

* * * * *